United States Patent [19]

Sakai

[11] 4,177,488
[45] Dec. 4, 1979

[54] MAGNETIC RECORDING AND PLAYBACK MEANS WITH INDICATION OF TAPE REMAINING

[75] Inventor: Koichi Sakai, Otsu, Japan

[73] Assignee: Matsushita Electric Industrial Co., Ltd., Kadoma, Japan

[21] Appl. No.: 870,083

[22] Filed: Jan. 17, 1978

[30] Foreign Application Priority Data

Jan. 17, 1977 [JP] Japan .............................. 52-4597[U]
Feb. 2, 1977 [JP] Japan .................................. 52-11080
Feb. 3, 1977 [JP] Japan ............................. 52-12222[U]

[51] Int. Cl.$^2$ ...................... G11B 19/06; G11B 27/14; G11B 23/04
[52] U.S. Cl. ......................... 360/72.3; 179/100.1 DR; 360/137
[58] Field of Search ..................... 360/72, 137, 71, 74; 179/100.1 DR, 100.1 PS; 340/366 R, 366 E, 347 AD

[56] References Cited

U.S. PATENT DOCUMENTS

| 3,761,643 | 9/1973 | Keeler | 360/137 |
| 3,930,253 | 12/1975 | Maida | 340/347 AD |
| 4,014,043 | 3/1977 | Yoshi | 360/137 |
| 4,044,233 | 8/1977 | Sato | 360/137 |
| 4,051,540 | 9/1977 | Wilder et al. | 360/72 |
| 4,092,680 | 5/1978 | Sander | 360/72 |

Primary Examiner—Alfred H. Eddleman
Attorney, Agent, or Firm—Wenderoth, Lind & Ponack

[57] ABSTRACT

Magnetic recording and playback means employing cassette tape in which signals representative of the rotation period of a tape reel stand are supplied to a flip-flop ring counter which also receives reference input signals from another pulse emitter and which can actuate a linear array of externally viewable display means, the number of display means actuated in this array being dependent on the rotation period of the reel stand, whereby, since this rotation period is proportional to the amount of tape on a reel supported by the stand, there is given an immediately appreciable indication of the amount of tape remaining available for recording or playback.

7 Claims, 21 Drawing Figures start of large amount of unwinding tape start of small amount of unwiding tape

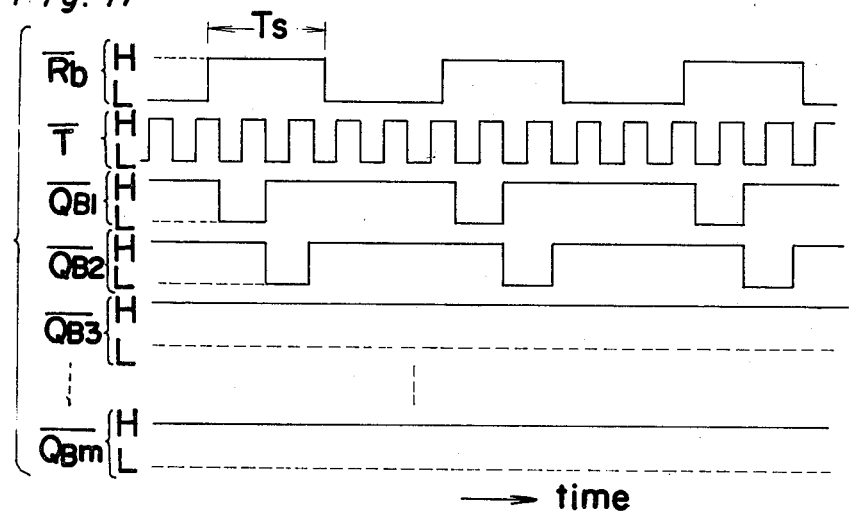
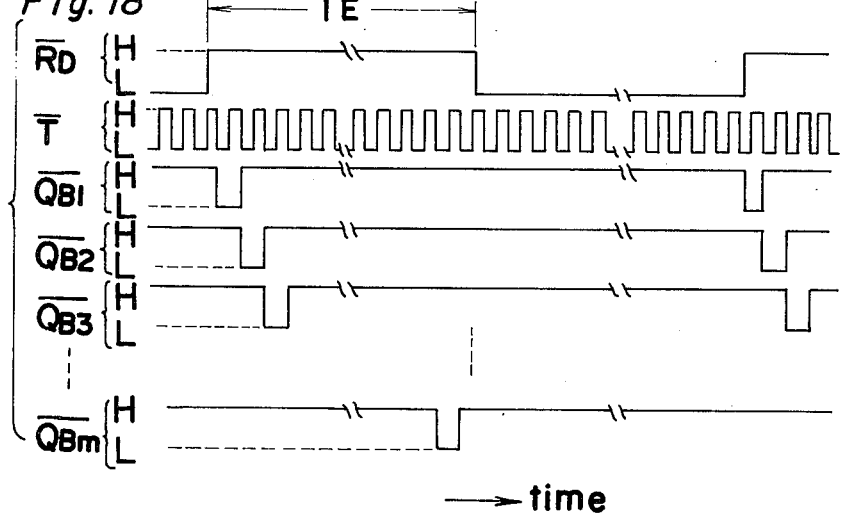

MAGNETIC RECORDING AND PLAYBACK MEANS WITH INDICATION OF TAPE REMAINING

The present invention relates to an electromagnetic recording and playback means employing cassette tape, and more particularly to a tape travel indication device in such a means.

Generally employed conventional means for indicating how much electromagnetic tape in a recording means has been unwound or rewound comprise, for example, rotary disc means which is connected by a belt or similar means to a tape pulley, and which is rotated proportionally to the rotation of the pulley, and has defined therein slit or hole portions which, as the tape is moved, are successively brought into line with a light source in the tape recorder and a window provided in the outer wall of the casing of the tape recorder, whereby there is displayed on the exterior of the tape recorder a display which changes as the amount of tape which is unwound or wound up changes. To give a continuous indication of the amount of tape which is unwound, the commonest procedure is to employ a mechanical counter the content of which is successively increased as the amount of unwound tape is increased. For persons using tape recorders for professional purposes, this method of indication is satisfactory, but for amateur users of tape recorders it is often very inconvenient or insufficient. For example, the relationship between a given count number and the amount of remaining tape, or playing time, is generally not immediately clear, but requiring a calculation to convert the indicator count to time. Another disadvantage is that it is necessary to reset the count to zero at the start of each tape placed in the tape recorder. It may very easily be forgotten to do this when only portions of cassette tapes are recorded and different tapes are used in comparatively rapid succession, with the result that it becomes very difficult to appreciate exactly how much of each tape has been used for recording and how much thereof is still useable for further recording. A further disadvantage of conventional indication means is that in small cassette tape recorders, the indication is small and often difficult to read.

It is known to provide means which detects when the rotation period of a tape pulley shaft reaches a certain value, i.e., when a certain amount of tape has been unwound, and actuates a display in response to this detection. However, such conventional means gives a display only at one or two points 3 to 5 minutes before the end of a tape is reached, and does not provide the user with means for a precise check on the amount of tape available.

It is accordingly an object of the invention to provide an electromagnetic recording and playback means employing cassette tape by which it is made possible to have an immediate grasp, over the whole length of tape employed, of what point of a tape has been reached and of how much tape is still left for recording or playback.

In achieving this and other objects, there is provided, according to the invention, an electromagnetic tape recording and playback means comprising an indicator device in which lamps in a line array are successively lit in accordance with the rotation period of the tape windup or supply pulley shaft, i.e., in accordance with the amount of tape which has been unwound, whereby, by observation of which lamp is lit, it is immediately made clear how much tape is unwound. To further facilitate appreciation of the display, the lamps may be colored. For example, lamps which are successively lit during unwinding of the first two-thirds of the length of tape may be green, succeeding lamps may be yellow, and lamps which are lit during unwinding of the end portion of tape, permitting for example, three minutes of recording, may be red. In the means of the invention, the lamps of the indicator device are all turned off, i.e., the indicator device is automatically reset to zero, when a tape is removed but as soon as playback or recording of another inserted tape is commenced, the amount of tape unwound is immediately indicated, even if playback or recording of the other tape is commenced at a mid-point of the tape.

A better understanding of the present invention may be had from the following full description of several preferred embodiments thereof when read in reference to the attached drawings, in which like numbers refer to like elements, and in which FIG. 1 is a graph of the rotation period of a tape supply pulley and a tape take-up pulley relative to the amount of tape unreeled;

FIGS. 15 through 20 are a similar set of drawings of the same type as FIGS. 3 through 8 respectively and relating to a third embodiment of the invention.

In the following description, the terms H, or high, level and L, or low, level in reference to control circuit elements are to be taken as indicating a logic 1 state and a logic 0 state, respectively.

Figure 1:
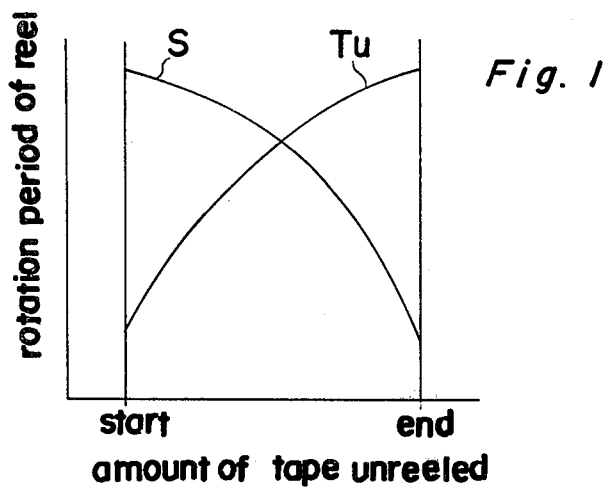
Figure 2:
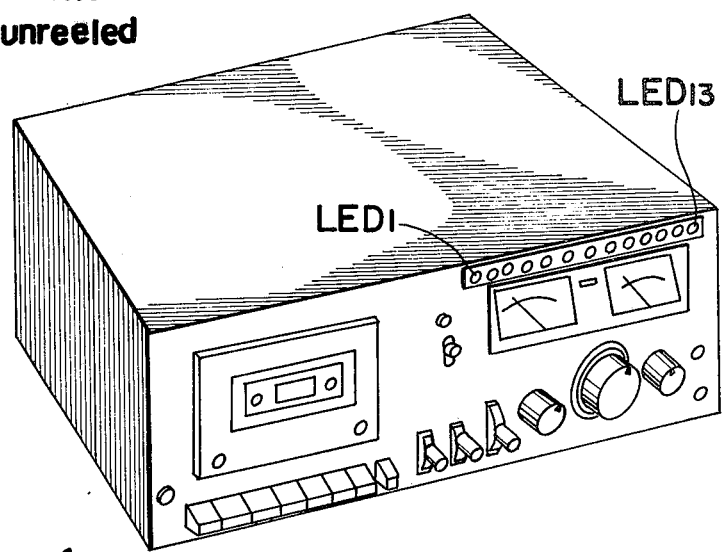
FIG. 2 is a perspective view showing the external appearance of an electromagnetic recording and playback means according to a first embodiment of the invention.
Figure 3:
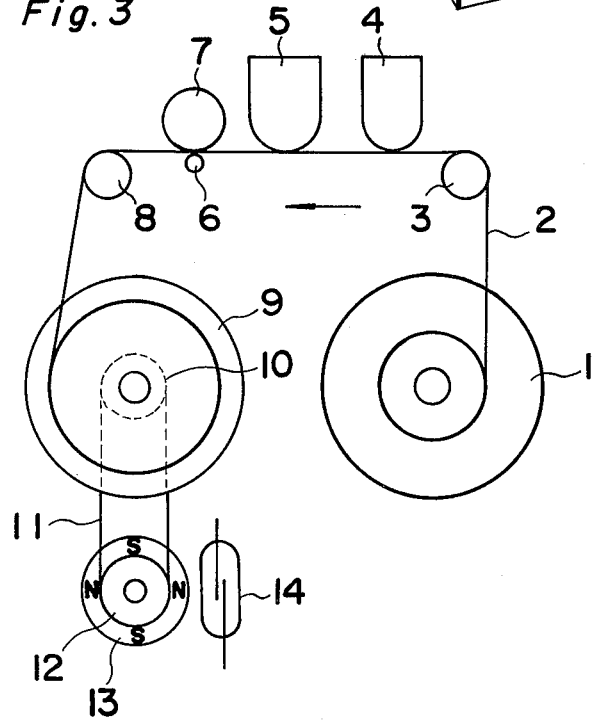
FIG. 3 is a schematic view showing the main elements of the means of FIG. 2.

Referring initially the graph of FIG. 1, presuming that tape unreeled from a supply reel S onto a take-up reel TU is moved at a constant speed past a point intermediate the reels, the rotary speed of the reels is inversely proportional, and rotation period thereof, i.e., the time for one completion revolution thereof, is directly proportional to the diameter of the roll of tape thereon, and the rotation period of the supply reel S is a maximum at the start of tape unreeling and a minimum at the end of tape unreeling, whereas the rotation period of the take-up reel TU changes in inverse proportion to the rotation period of the supply reel S. The invention takes advantage of this fact to actuate a display constituted by a linear array of light-emitting diodes $LED_1$ to $LED_{13}$, for example, which as shown in FIG. 2, is disposed on the front of a cassette tape recorder, inside which, as shown in FIG. 3, there is provided a supply reel 1, from which tape 2 is unwound and moved successively around a guide roller 3, past an erasure head 4 and a recording and playback head 5, between a capstan 6 and a pinch roller 7, and past a guide roller 8, and then is wound up on a take-up reel 9 mounted on a reel stand 10.

Rotation of reel stand 10 is transmitted by a belt 11 to a rotatable pulley 12. Coaxially and fixedly mounted on pulley 12 there is a ring magnet 13 which rotates together with pulley 12. Ring magnet 13 has diametrically opposed south poles S, and diametrically opposed north poles N, each separated by one quadrant of magnet 13 from each south pole S. A reed switch 14 is positioned near ring magnet 13 and is caused to open or close as ring magnet 13 is rotated and different poles thereof are brought to and past a point in the peripheral travel of magnet 13 which is closest to reed switch 14. Since the period of time which elapses between transport of successive poles of ring magnet 13 to and past this point is directly dependent on the rotation period of take-up reel 9, and the rotation period of take-up reel 9 is proportional to the amount of tape 2 wound up thereon, the length of time which reed switch 14 remains opened or closed subsequent to opening or closing thereof is also dependent on the amount of tape wound on take up reel 9.

Figure 4:
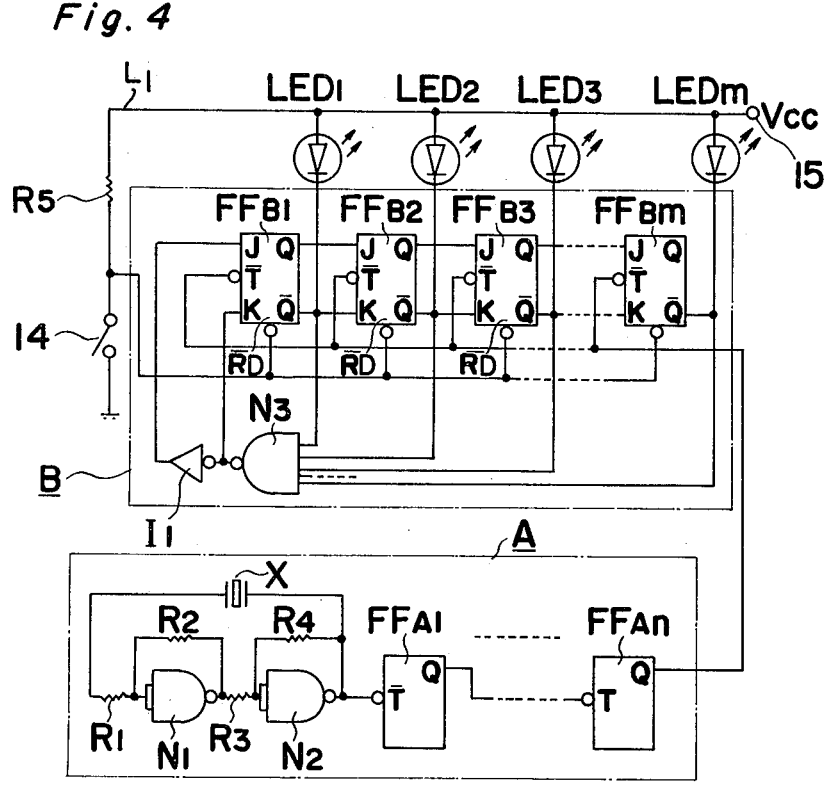
FIG. 4 is a circuit diagrams of a control circuit employed in the means of FIG. 2.

Reed switch 14 is included in a control circuit shown in FIG. 4, to which reference is now had.

In the circuit of FIG. 4, the portion indicated by the letter A and enclosed in a two-dot chain line is a circuit for emission of clock pulses serving as reference signals and comprises a crystal oscillator X connected through resistor $R_1$ to the input of NAND gate $N_1$ and to the output of NAND gate $N_2$ the input of which is connected to the output of NAND gate $N_1$ through resistor $R_3$. Resistor $R_2$ is connected between the input and output of NAND gate $N_1$, and a similarly connected resistor $R_4$ is provided in association with NAND gate $N_2$. The output of NAND gate $N_2$ is supplied to the T' input terminal of flip-flop $FFA_1$, which is the first flip-flop in a frequency dividing circuit comprising flip-flops $FFA_1$ to $FFA_n$ connected in cascade, the Q output of each flip-flop being supplied as T input to the succeeding flip-flop in the circuit. If the oscillation frequency of crystal oscillator X is fx, and the number of stages in the flip-flop circuit is n, the period of fA of the output signal of pulse emission circuit A, which is produced at the Q terminal of flip-flop $FFA_n$, may be expressed as $$fA = 1/(fx/2^n)(\text{sec}) \tag{1}$$

The output from clock pulse emission circuit A is supplied to the T' input of each of the flip-flops $FFB_1$ to $FFB_m$ each of which has, in addition to a T' input J and K inputs, a reset input terminal RD', and Q and Q' outputs, and which are disposed in a cascade array to define a ring counter in light-emitting diode actuation circuit B, shown in the upper portion of FIG. 4, the Q output terminal and Q' output terminal of each of the flip-flops in this array which precede flip-flop $FFB_m$ being connected directly to the J input terminal and K input terminal, respectively, of the succeeding flip-flop.

Circuit B includes the above described reed switch 14, which has one terminal connected to ground and the other terminal of which is connected through resistor $R_5$ to power line $L_1$ to which DC source voltage VCC is applied via terminal 15. The anode of each of a series of light-emitting diodes $LED_1$ to $LED_m$, which are viewable on the exterior of the tape recorder and which are arranged in the manner shown in FIG. 2 and are provided in one-to-one correspondence with the flip-flops $FFB_1$ to $FFB_m$, is connected to line $L_1$, and the cathode thereof is connected to the Q' output terminal of the correspondingly numbered flip-flop $FFB_1$ to $FFB_m$. The Q' output terminal of each of the flip-flops $FFB_1$ to $FFB_m$ is also connected to an input terminal of NAND gate $N_3$. The output of NAND gate $N_3$, which is thus at a low level only when all the flip-flops $FFB_1$ to $FFB_m$ are reset and the level at all Q' output terminals is high, and which is at an H level if any one of the flip-flops $FFB_1$ to $FFB_m$ is in the 1 state, i.e., the level at the Q output terminal thereof is H and the level at the Q' output terminal thereof is L, is supplied directly to the K input terminal of first flip-flop $FFB_1$ and via inverter $I_1$ to the J input terminal of first flip-flop $FFB_1$, whereby when the level at the J input terminal of first flip-flop $FFB_1$ is high, the level at the K input terminal thereof is low, and vice-versa.

Reset input to the RD' input terminals of all the flip-flops $FFB_1$ to $FFB_m$ is supplied simultaneously from the junction of reed switch 14 and resistor $R_5$.

In the abovedescribed circuit, starting from the situation in which the rotational position of ring magnet 13 connected to take-up pulley stand 10 is such that reed switch 14 is closed and all the flip-flops $FFB_1$ to $FFB_m$ are reset, L level output is supplied from NAND gate $N_3$ to the K input terminal of flip-flop $FFB_1$ and H level input is supplied from inverter $I_1$ to the J input terminal of the same flip-flop. If now reed switch 14 changes from the closed to the open condition due to rotation of take-up reel stand 10, reset input to flip-flops $FFB_1$ to $FFB_m$ is cancelled, and upon arrival at the T' input terminals of flip-flops $FFB_1$–$FFB_m$ of a clock pulse supplied from clock pulse emission circuit A, the Q and Q' outputs of flip-flop $FFB_1$ become H and L, respectively, and light emitting diode $LED_1$ lights up. The Q and Q' outputs of first flip-flop $FFB_1$ are supplied directly to the J and K inputs respectively, of second flip-flop $FFB_2$, and so upon emission of the second clock pulse by clock pulse emission circuit A, second flip-flop $FFB2$ is set to the first state, the Q and Q' outputs thereof become respectively H and L, and light emitting diode $LED_2$ lights up.

However, first flip-flop $FFB_1$ is then set to the 1 state, and the L level output produced at the Q' output terminal thereof results in the output of NAND gate $N_3$ becoming H. Therefore, levels of input to the input terminals J and K of first flip-flop $FFB_1$ become L and H, respectively, and the second clock pulse supplied to the T' input terminal of first flip-flop $FFB_1$ causes first flip-flop $FFB_1$ to be cleared to the 0 state, which results in the Q and Q' outputs thereof becoming L and H, respectively, and light emitting diode $LED_1$ is turned off. In other words, light emitting diode $LED_1$ is turned off simultaneously with the turning on of light emitting diode $LED_2$. If reed switch 14 stays open, emission of a third clock pulse results in output from second $FFB_2$ setting third flip-flop $FFB_3$ to the 1 state, thus causing lighting of the third light emitting diode $LED_3$, and output from first flip-flop $FFB_1$ resetting second flip-flop $FFB_2$ to the 0 state, thus causing light emitting diode $LED_2$ to be turned off, third flip-flop $FFB_3$ being in the 1 state, and input to first flip-flop $FFB_1$ remains unchanged. While reed switch 14 stays open, this action is repeated, and successively higher numbered light emitting diodes are lit, one at a time.

When, however, reed switch 14 is reclosed, all the flip-flops $FFB_1$ to $FFB_m$ are reset, because the level of input at the RD' input terminals thereof becomes low. All the light emitting diodes $LED_1$ to $LED_m$ are therefore turned off, and remain turned off until reed switch 14 is again opened, and the level of input to the RD' terminals of flip-flops $FFB_1$ to $FFB_m$ again becomes high, subsequent to which the abovedescribed circuit action is repeated.

Figure 5:
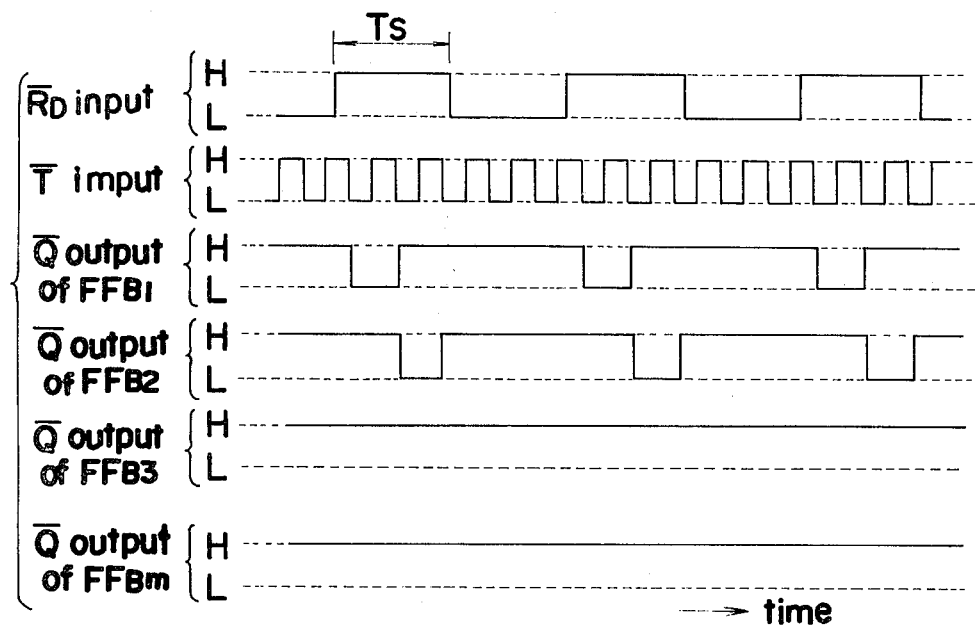
FIGS. 5 and 6 are time-charts showing the action of the circuit of FIG. 4 near the beginning and end, respectively, of unreeling of tape.
Figure 7:
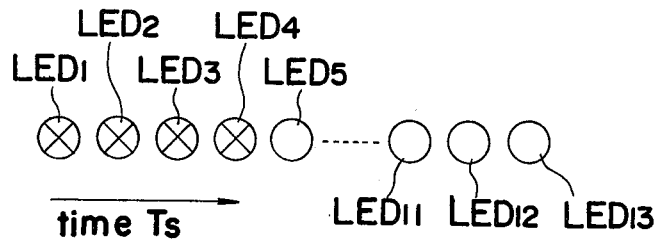
FIGS. 7 and 8 are schematic drawings, of lamp indications achieved by the circuit action of FIGS. 5 and 6, respectively.

Referring now to the timing chart of FIG. 5, at the start of unwinding of tape 2, the amount of tape on take-up reel 9 is comparatively small and the rotation period of take-up reel stand 10, and hence of ring magnet 13, is correspondingly short. Thus, the length of time TS for which switch 14 remains open and level of input to input terminals RD' of flip-flops $FFB_1$ to $FFB_m$ is high and the duration of actuation of successive flip-flops FFB subsequent to opening of switch 14 is comparatively short. At the start of unwinding of tape, therefore, the number of the highest numbered light emitting diode which can be caused to light up before all the flip-flops $FFB_1$ to $FFB_m$ are reset is comparatively low. For example, as illustrated in FIG. 7, near the start of unwinding of tape 2, time TS is sufficiently long to permit only diodes up to light emitting diode $LED_4$ to be lit, but then switch 14 is closed, the level of RD' input to all flip-flops $FFB_1$ to $FFB_m$ becomes low, and all the light emitting diodes $LED_1$ to $LED_m$ are deenergized until switch 14 again opens, after which lighting up of the light emitting diodes again starts from diode $LED_1$. It will be noted that although time TS is only long enough to permit lighting of up to light emitting diode $LED_4$, for example, since, subsequent to RD' input deenergizing all the light emitting diodes, lighting of the light emitting diodes, starting with light emitting diode $LED_1$, recommences after take-up reel stand 10 has rotated only one quarter of a revolution, the display, such as shown in FIG. 2, which is viewable by the user, is one in which lighting of successive light emitting diodes up to diode $LED_4$ is repeatedly effected.

Figure 6:
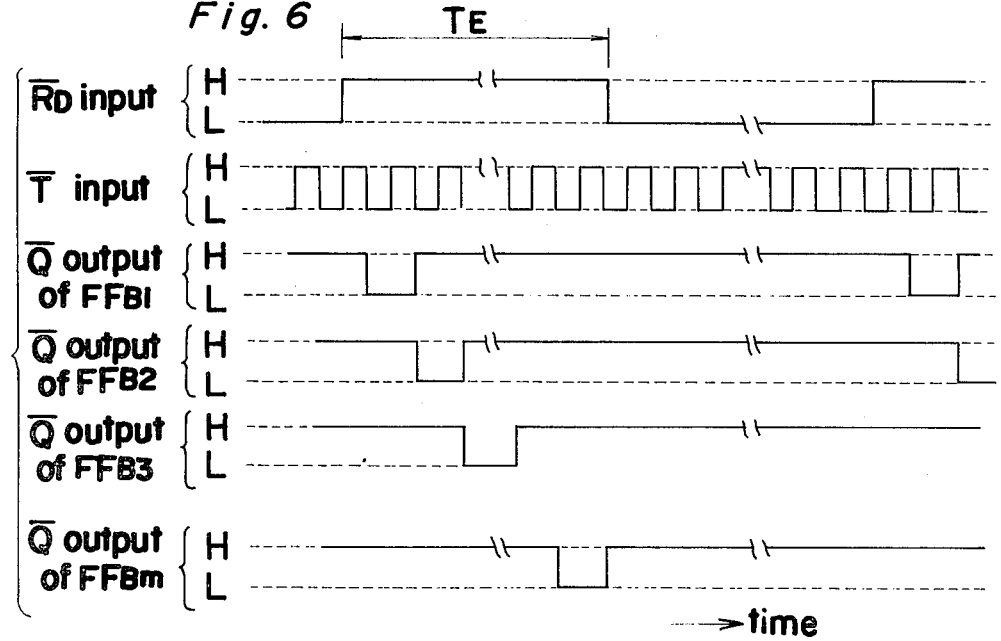
Figure 8:
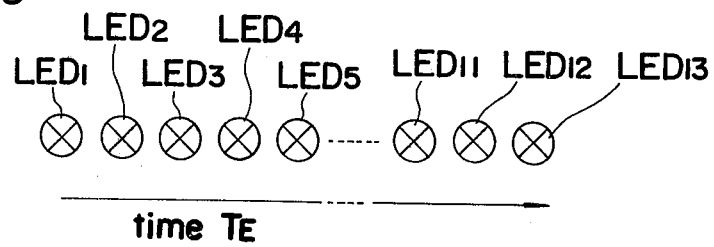

As the end of the tape is approached, the amount of tape on take up reel 9 is much greater, and the rotation period of take-up reel stand 10 and ring magnet 13 is much longer, and as indicated in FIG. 6 the time TE during which reed switch 14 is open and input to input terminals RD' of flip-flops $FFB_1$ to $FFB_m$ is such as to permit setting of successive flip-flops $FFB_1$ to $FFB_m$ to the 1 state and actuation of successive light emitting diodes $LED_1$ to $LED_m$ is much longer, and may be sufficient to permit lighting all the photo emitting diodes. In this case, as shown in FIG. 8, there is shown a display in which there is repeated lighting of all the light emitting diodes in turn.

Thus, in the means of the invention, the number of the highest numbered light emitting diode in the display array indicated in FIG. 2 becomes greater as the amount of tape wound up on the take-up reel becomes greater, and for a tape of given total length the user is made immediately aware of how much of the tape has been used, and how much of the tape remains available for recording or playback. For improved an indication, for example numbers indicative of remaining playing time, may of course be provided by the light emitting diodes on the front of the tape recorder.

If the user makes it a practice to employ tapes having different total lengths, it is of course necessary to remember approximately what length of remaining tape is represented by lighting up of a particular light emitting diode, since lighting up of light emitting diode $LED_{10}$, for example, may occur when almost the end of a comparatively short tape is reached, but occur when a considerable length of a longer tape still remains available, and in such a case the display of all the light emitting diodes may be of the same color. If, however, it is made a practice to use a tape of standard length, the display can be improved by making the display of light emitting diodes with lower order numbers a display of one color, for example, green, that of higher numbered diodes another color, for example, yellow, and that of diodes which are lit when the tape has been almost entirely unwound another color, for example, red.

It is evident that in the means of the invention, the indication of the amount of remaining available tape is not as precise as that given by a numerical tape count indication. Therefore, in cases in which very precise location of a particular point of a tape is required, the means of the invention preferably has associated therewith a conventional numerical tape count system. It will be noted that such association with conventional means is easily achieved, since conventional means require, at some point, a take-off element which is rotated proportionally to rotation of a tape reel, and a rotatable magnet may be easily connected to and rotated by such a take-off element. On the other hand, the invention offers definite advantages over conventional means in that (1) The amount of tape unwound and the amount still available are made immediately apparent without it being necessary to make any calculation on the basis of a starting number of a tape count indication, zero or another number.

(2) There is no problem of forgetting to reset a tape unwinding indication to zero when a new tape is placed in the tape recorder, since the flip-flop circuit controlling the light-emitting diode display is automatically cleared when a tape is removed.

(3) In the means of the invention there is given a display which is not achievable in conventional means, since even if a newly inserted tape is already half unwound, as may be the case for example during use of cassette tape, an indication of the amount of unwound and remaining tape is given directly.

In the control circuit of the means of the invention, use of a crystal oscillator for production of clock pulses is preferable from the point of view of precision and stability, but of course clock pulses may also be obtained by demultiplication of signals from a source at a commercial frequency (50, 60 Hz), or by use of an oscillator circuit constituted by capacitance, resistance, and inductance elements.

Also, by providing a demultiplication circuit between reed switch 14 and circuit B of FIG. 3, the period of input produced by opening and closing of reed switch 14 can be reduced, for example, to one half or one quarter. Provision of such a demultiplication circuit makes it possible to adjust the number of light emitting diodes which are lit when a given length of tape is unwound, and can also serve to suppress effects of any displacement of poles of the magnet or of noise in the mechanical system.

Figure 9:
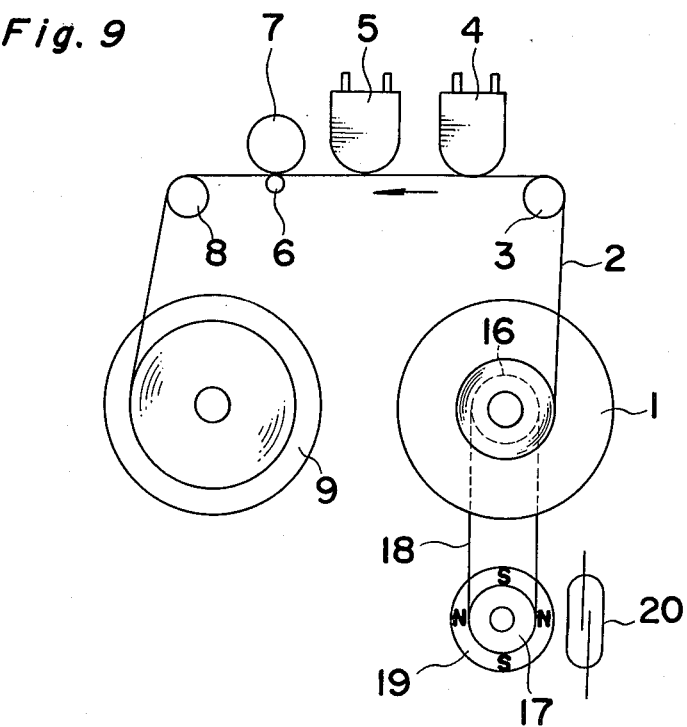
FIGS. 9, 10, 11, 12, 13 and 14 are drawings similar to FIGS. 3, 4, 5, 6, 7 and 8 respectively and relating to a second embodiment of the invention.

Reference is now had to FIG. 9, which shows another embodiment of the invention in which the rotation period of supply reel 1, instead of that of take-up reel 9, is detected. As shown in the drawing, the detection means comprises belt 18 for transmission of drive from supply reel stand 16 to rotatable pulley 17 on which a ring magnet 19 is coaxially and fixedly mounted, and a reed switch 20 which is near to and is opened and closed by ring magnet 19.

Figure 10:
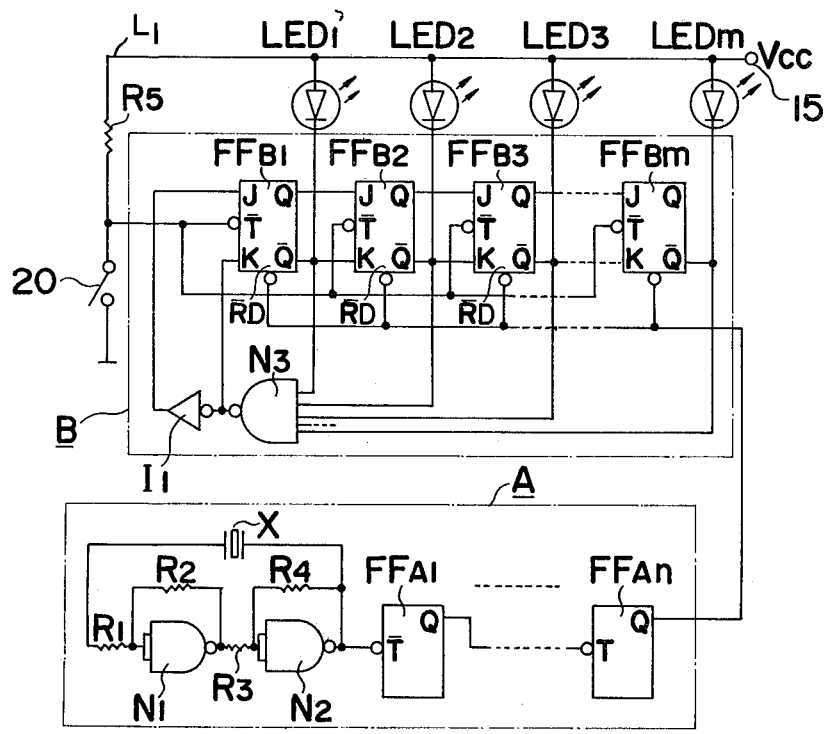

The associated control circuit is shown in FIG. 10, to which reference is now had. The elements of this circuit which comprises a clock, or reference pulse emitter circuit $A_2$ and a light emitting diode actuation circuit $B_2$ are basically the same as in the circuit of FIG. 3, but reed switch 20 for detection of the rotation period of supply reel 1 replaces reed switch 14 for detection of the rotation period of take-up reel 9 and the following changes of connections are made. Signals produced by opening and closing of reed switch 20 are supplied not to the RD' input terminals but to the T' input terminals of the flip-flops $FFB_1$ to $FFB_m$ in circuit $B_2$ and the output of pulse emission circuit $A_2$ is supplied to the RD' terminals of flip-flops $FFB_1$ to $FFB_m$ in circuit $B_2$. Light emitting diodes $LED_1$ to $LED_m$ are caused to light one at a time by basically the same action as described in reference to FIG. 3, but the timing of the steps of the circuit action is different, as may be seen from reference to the timing charts of FIGS. 11 and 12.

Figure 11:
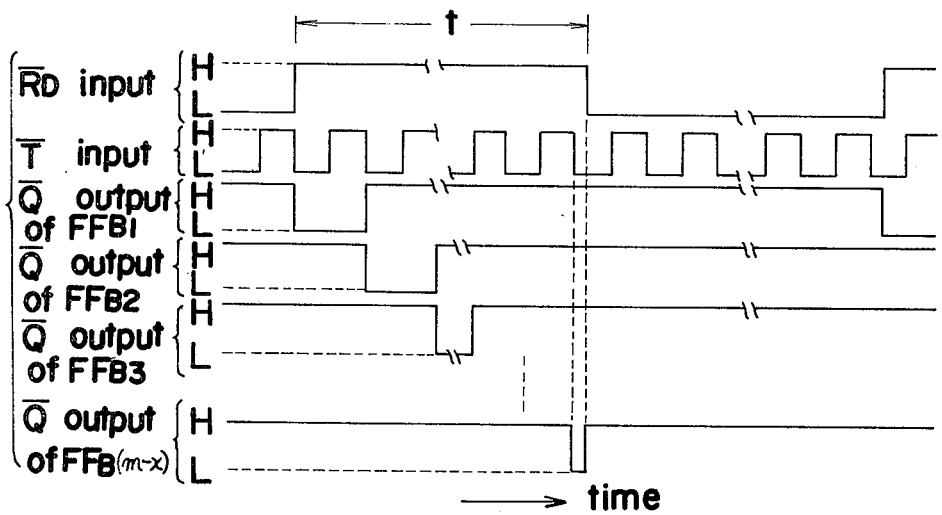

In FIG. 11, with a low level input initially supplied to the RD' input terminals of flip-flops $FFB_1$ to $FFB_m$ from pulse emission circuit $A_2$, all the flip-flops $FFB_1$ to $FFB_m$ are reset, and levels of input to the J input terminal and K input terminal of first flip-flop $FFB_1$ are respectively high and low. In this condition, a change of input to the TD' input terminal of first flip-flop $FFB_1$ from low level to high level, due to movement of reed switch 20 from the closed to the open position, is ineffective in setting first flip-flop $FFB_1$ to the 1 state since reset input is still supplied to the RD' input terminals. However, after output from pulse emission circuit $A_2$ changes from low to high, subsequent changes of TD' input from high to low level is effective in setting successive flip-flops FFB to the 1 state and causing successive light emitting diodes LED to light in the manner described above until level of RD' input supplied from circuit $A_2$ again becomes low and all the flip-flops $FFB_1$ to $FFB_m$ are reset, lighting of light emitting diodes restarting from light emitting diode $LED_1$ when RD' input subsequently returns to a high level.

Figure 13:
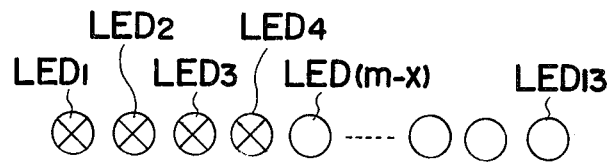

In the circuit of FIG. 10 the time t during which RD' input to flip-flops $FFB_1$ to $FFB_m$ is high and successive light emitting diodes LED can be lit is constant, and is determined by the oscillation frequency of the oscillator circuit and the number of stages in the demultiplication circuit in circuit $A_2$. At the start of unwinding, tape supply reel 1 rotates slowly, and so the frequency of opening and closing of reed switch 20, and hence of low TD' input permitting actuation of successive flip-flops FFB, is low. Therefore, in the set time t only a limited number of light emitting diodes can be lit, for example up to light emitting diode $LED_4$, as illustrated in FIG. 13.

Figure 12:
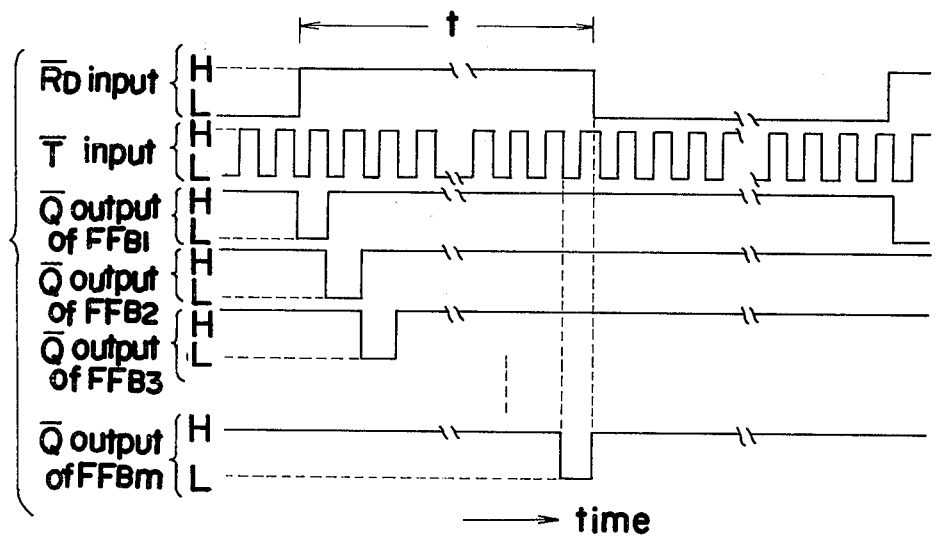
Figure 14:
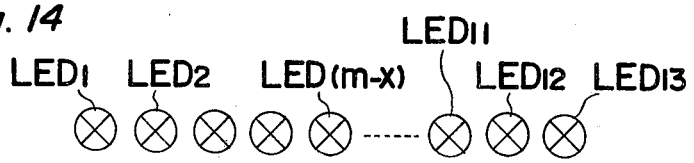

Referring to FIG. 12, when a large proportion of tape has been unwound, supply reel 1 rotates faster. Therefore, the frequency of opening and closing of reed switch 20 and of supply of low level TD' input to flip-flops $FFB_1$ to $FFB_m$ is increased, and a greater number of light emitting diodes LED can be lit in the set time t. When almost all the tape has been unwound, supply reel 1 rotates very rapidly and all the light emitting diodes $LED_1$ to $LED_m$ can be lit in the set time t, as illustrated in FIG. 14.

Figure 15:
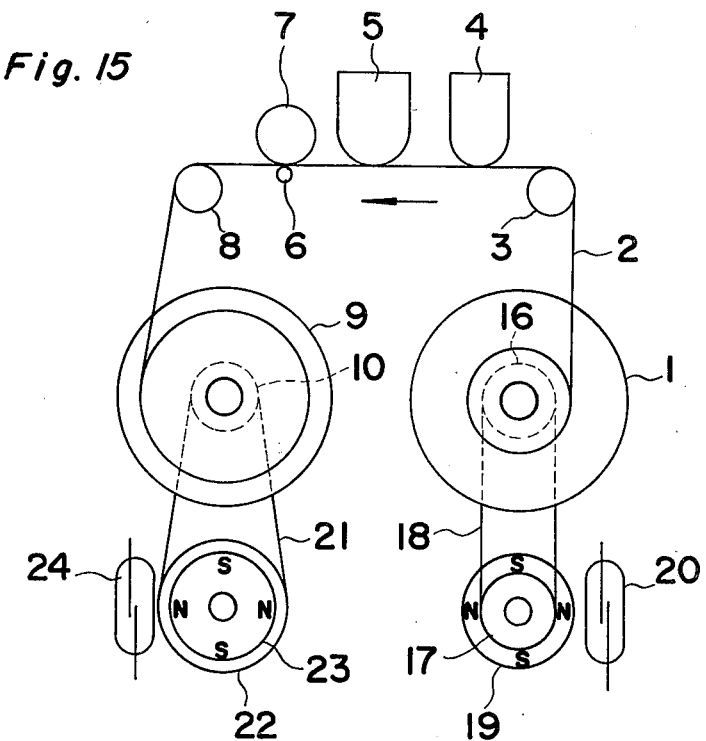

Reference is now had to FIGS. 15 through 20, which show another embodiment of the invention in which the rotation period both of supply reel 1 and take-up reel 9 are detected. In FIG. 15, the rotation period of supply reel 1 is detected by a set of elements including pulley 19 connected to supply reel stand 16 connected by belt 18, ring magnet 17 mounted on pulley 19, and reed switch 20 positioned near magnet 17, and the rotation period of take-up reel 9 by a set of elements including pulley 22 connected to take-up reel stand 10 by belt 21, ring magnet 23 mounted on pulley 22, and reed switch 24 positioned near magnet 23.

The various detection elements associated with supply reel 1 and take-up reel 9 have the same construction and are disposed in the same relation to one another in the same manner as described above. However, the diameter of pulley 22 which is rotated by take-up reel stand 10 acting through belt 21 is made much larger than the diameter of pulley 19 rotated by supply reel stand 16, in order to ensure that, whatever the amount of tape that has been unwound from supply reel 1, the speed of rotation of pulley 19 is greater than that of pulley 22 and the period of opening or closure of switch 20 is shorter than that of switch 14.

Figure 16:
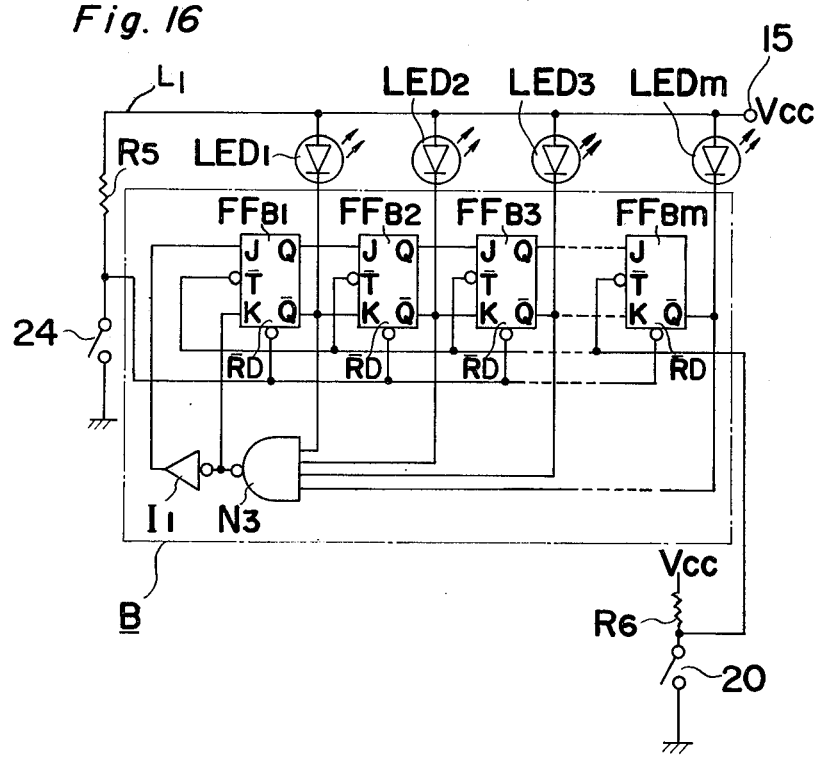

In FIG. 16, the associated control circuit comprises light emitting diode actuation circuit $B_3$, which has the same construction as circuit B of FIG. 3, reed switch 24 having one terminal connected to ground and one terminal connected through resistor $R_5$ to power line $L_1$ leading to terminal 15 of DC source VCC, and RD' input to flip-flops $FFB_1$ to $FFB_m$ being supplied from the junction of switch 24 and resistor $R_5$.

Reed switch 20 associated with supply reel 1 has one terminal connected to ground and the other terminal thereof connected through resistor $R_6$ to DC source VCC. Input to the T' input terminals of flip-flops $FFB_1$ to $FFB_m$ in circuit $B_3$ is supplied from the junction of switch 20 and resistor $R_6$.

In the circuit of FIG. 16, when RD' input and T' input to flip-flops $FFB_1$ to $FFB_m$ are respectively at a high level and at low level, successive flip-flops FFB are actuated to cause lighting of light emitting diodes LED one at a time by the same basic circuit action as described above, details of the timing of circuit action steps being shown in FIGS. 17 and 18.

Figure 19:
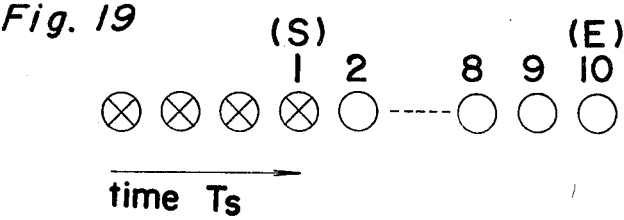

In FIG. 17, at the start of unwinding of tape from a full supply reel 1, the rotation period of take-up reel 9 is comparatively short, resulting in a comparatively short time TS during which reed switch 24 is open and high RD' input permitting actuation of flip-flops FFB is supplied. On the other hand, supply reel 1 rotates comparatively slowly, and so the time during which any one low level input signal is supplied to the flip-flop T' input terminals, although shorter than time TS due to diameter of pulley 22 being much greater than that of pulley 19, as noted above, is comparatively long. In other words, at the start of tape unwinding, only a few low-level T' inputs permitting setting of successive flip-flops to the 1 state can be supplied in the short time TS during which RD' input is at a high level, and only a few light emitting diodes can be lit in the time TS, for example up to light emitting diode $LED_4$, as illustrated in FIG. 19.

Figure 20:
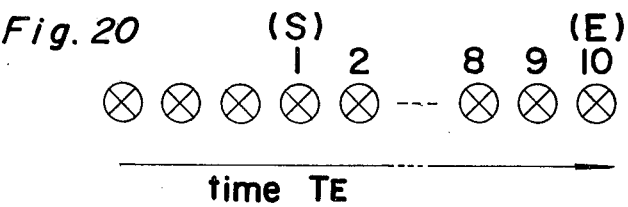

In FIG. 18, when most of the tape has been wound up onto the take-up reel 9, take-up reel 9 rotates more slowly and the time TE during which a high-level input is maintained at the RD' input terminals of the flip-flops $FFB_1$ to $FFB_m$ becomes longer, while supply reel 1 rotates more quickly, the frequency of opening and closing of reed switch 20 and hence of the supply of successive low-level T' inputs is increased, and subsequent to lighting of light emitting diode LED$_1$ a greater number of light emitting diodes LED can be lit before all the flip-flops FFB$_1$ to FFB$_m$ are reset. When almost all the tape has been unwound from supply reel 1, time TE is long enough and the frequency of opening and closing of reed switch 20 is high enough to permit all the light emitting diodes to be lit, as illustrated in FIG. 20.

Figure 21:
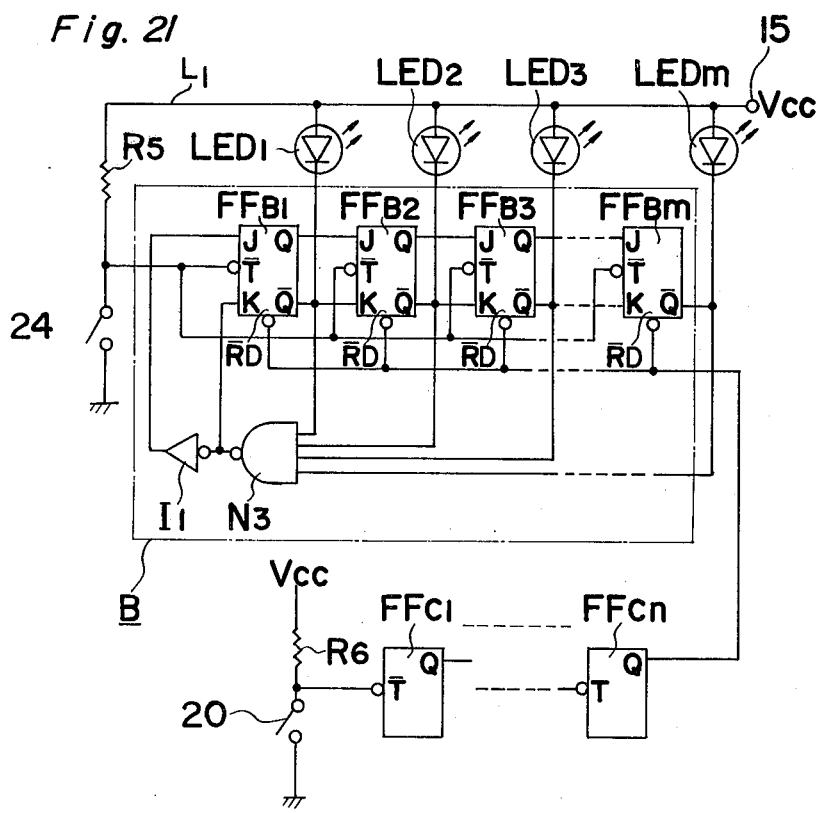
FIG. 21 is a circuit diagrams of a control circuit employed in an electromagnetic recording and playback means according to a fourth embodiment of the invention.

Referring to FIG. 21, even if pulleys 22 and 19 have the same diameter, it can be ensured that the opening and closure period of reed switch 24 associated with take-up reel 9 is always longer than that of reed switch 20 associated with supply reel 1 by providing between switch 20 and the RD' input terminals of the flip-flops FFB$_1$ to FFB$_m$ a separate circuit consisting of flip-flops FFc$_1$ to FFc$_n$ and serving to demultiply pulse input supplied from switch 20.

Although the present invention has been fully described by way of example with reference to the attached drawings, it is to be noted that various changes and modifications will be apparent to those skilled in the art. Therefore, unless otherwise such changes and modifications depart from the scope of the present invention, they should be construed as being included therein.

What is claimed is:

1. Magnetic recording and playback means employing tape cassette means in which electromagnetic tape is contained in a case, said recording and playback means comprising:
    a supply reel stand for supporting a supply reel and rotatable to cause unwinding or winding of tape from or onto a supply reel on said supply reel stand;
    a take-up reel stand for supporting a take-up reel and rotatable to cause winding or unwinding of tape onto or from a take-up reel on said take-up reel stand;
    guide means for guiding said tape along a set path between said reel stands;
    recording and playback means located near said path for effecting recording and playback of audio or video signals on or from the tape;
    first pulse emission means operatively associated with one of said reel stands for emitting periodic pulses proportional to the rotation period of said one of said reel stands;
    second pulse emission means separate from said first pulse emission means;
    a ring counter connected to said pulse emission means and constituted by a plurality of cascade-connected flip-flops in which the stored content is shifted each time said counter receives an input of one pulse emitted by one of said pulse emission means and which are reset upon reception of a pulse emitted as output by the other of said pulse emission means; and
    a plurality of display means disposed in a linear array, and each of which is connected with a corresponding flip-flop in said ring counter and is caused to light when the corresponding said flip-flop is set;
    whereby said display means are caused to light in order starting from the display means connected to the flip-flop which is nearest the input terminals of said ring counter, and the number of said display means which is caused to light being proportional to the amount of tape unwound from said supply reel and wound onto said take-up reel, and the amount of tape remaining available for recording or playback is thereby indicated.

2. Magnetic recording and playback means as claimed in claim 1, wherein said first pulse emission means is associated with said take-up reel stand and comprises means for emitting pulses proportional to the rotation period of said take-up reel stand and the pulses emitted thereby are supplied as reset input to said ring counter, and said second pulse emission means is constituted by an emitter of reference signals of a set period which are supplied as clock pulses to said ring counter, the pulse width of the pulses emitted by said first emission means always being greater than the pulse width of the pulses emitted by said second pulse emission means.

3. Magnetic recording and playback means as claimed in claim 1, wherein said first pulse emission means is associated with said supply reel stand and comprises means for emitting pulses which are proportional to the rotation period of said supply reel stand and are supplied as clock pulses to said ring counter, and said second pulse emission means is constituted by an emitter of reference signals of a set period which are supplied as reset signals to said ring counter, the pulse width of the pulses emitted by said first pulse emission means always being greater than the pulse width of the pulses emitted by said second pulse emission means.

4. Magnetic recording and playback means as claimed in claim 1, wherein said first pulse emission means is associated with said take-up reel stand and comprises means for emitting pulses which are proportional to the rotation period of said take-up reel stand and are supplied as reset signals to said ring counter, and said second pulse emission means is associated with said supply reel stand and comprises means for emitting pulses which are proportional to the rotation period of said supply reel stand and are supplied as clock pulses to said ring counter. The pulse width of the pulses emitted by said first pulse emission means always being greater than pulse width of the pulses emitted by said second pulse emission means.

5. Magnetic recording and playback means as claimed in claim 1, wherein said display means are constituted by display means for displaying different colors.

6. Magnetic recording and playback means as claimed in claim 5, wherein said display means are divided into different groups and display a different color in each group.

7. Magnetic recording and playback means as claimed in claim 1, wherein each said display means has marked thereon an indication of the amount of tape which is still available for recording or playback.

* * * * *